US011621594B2

(12) United States Patent
Tang et al.

(10) Patent No.: US 11,621,594 B2
(45) Date of Patent: Apr. 4, 2023

(54) ELECTRIC MACHINE ROTOR

(71) Applicant: FORD GLOBAL TECHNOLOGIES, LLC, Dearborn, MI (US)

(72) Inventors: Chun Tang, Canton, MI (US); Franco Leonardi, Dearborn Heights, MI (US); Michael W. Degner, Novi, MI (US); Jacob Krizan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 17/011,593

(22) Filed: Sep. 3, 2020

(65) Prior Publication Data

US 2022/0069646 A1   Mar. 3, 2022

(51) Int. Cl.
*H02K 1/27* (2022.01)
*H02K 1/28* (2006.01)
*H02K 1/276* (2022.01)
*H02K 15/03* (2006.01)

(52) U.S. Cl.
CPC ............ *H02K 1/276* (2013.01); *H02K 1/28* (2013.01); *H02K 15/03* (2013.01)

(58) Field of Classification Search
CPC .......... H02K 1/276; H02K 1/28; H02K 15/03; H02K 29/03; H02K 2201/06; H02K 1/2766; H02K 2213/03; H02K 1/2773
See application file for complete search history.

(56) References Cited

U.S. PATENT DOCUMENTS

| | | | |
|---|---|---|---|
| 7,932,658 B2 | 4/2011 | Ionel | |
| 10,491,064 B2 | 11/2019 | Tang | |
| 10,523,072 B2 | 12/2019 | Tang et al. | |
| 2010/0026128 A1 | 2/2010 | Ionel | |
| 2017/0366056 A1* | 12/2017 | Tang | H02K 1/2766 |
| 2018/0138763 A1 | 5/2018 | Nakamura et al. | |

FOREIGN PATENT DOCUMENTS

| | | | |
|---|---|---|---|
| WO | 2013131795 A2 | 9/2013 | |
| WO | WO-2013131795 A2 * | 9/2013 | ........... H02K 1/2766 |

* cited by examiner

*Primary Examiner* — Thomas Truong
(74) *Attorney, Agent, or Firm* — David B Kelley; Brooks Kushman P.C.

(57) ABSTRACT

An electric machine rotor that is configured to rotate about a first axis includes a plurality of plates and plurality of permanent magnets. The plurality of plates are stacked along the first axis. Each of the plates defines V-shaped pairs of cavities. Each V-shaped pair of cavities defines a pole arc angle. Each cavity has a permanent magnet pocket and a magnetic field guide chamber extending radially outward from the permanent magnet pocket relative to the first axis. Offset angles between the magnetic field guide chambers and the permanent magnet pockets vary within each plate. The plates are stacked such that the permanent magnet pockets between adjacent plates are axially aligned and such that the magnetic field guide chambers between adjacent plates are axially offset. Each permanent magnet extends through a set of permanent magnet pockets.

20 Claims, 10 Drawing Sheets

ELECTRIC MACHINE ROTOR

TECHNICAL FIELD

The present disclosure relates to a rotor for a permanent magnet electric machine.

BACKGROUND

Electric machines typically employ a rotor and stator to produce torque. Electric current flows through the stator windings to produce a magnetic field. The magnetic field generated by the stator may cooperate with permanent magnets within the rotor to generate torque.

SUMMARY

An electric machine rotor that is configured to rotate about a first axis includes a plurality of plates and plurality of permanent magnets. The plurality of plates are stacked along the first axis. Each of the plates defines V-shaped pairs of cavities. Each V-shaped pair of cavities defines a pole arc angle. Each cavity has a permanent magnet pocket and a magnetic field guide chamber extending radially outward from the permanent magnet pocket relative to the first axis. Offset angles between the magnetic field guide chambers and the permanent magnet pockets vary within each plate. The plates are stacked such that the permanent magnet pockets between adjacent plates are axially aligned and such that the magnetic field guide chambers between adjacent plates are axially offset. Each permanent magnet extends through a set of permanent magnet pockets. Each permanent magnet pocket within each set of permanent magnet pockets are axially aligned relative to each other. Each set of permanent magnet pockets includes one permanent magnet pocket from each plate.

An electric machine rotor includes a plurality of plates. The plurality of plates are stacked along a first axis. Each of the plates defines V-shaped pairs of cavities. Each V-shaped pair of cavities defines a pole arc angle. Each cavity has a permanent magnet pocket and a magnetic field guide chamber extending radially outward from the permanent magnet pocket relative to the first axis. Offset angles between the magnetic field guide chambers and the permanent magnet pockets vary within at least one of the V-shaped pairs of cavities and do not vary within at least one of the V-shaped pairs of cavities within each plate. The plates are stacked such that the permanent magnet pockets between adjacent plates are axially aligned and such that the magnetic field guide chambers between adjacent plates are axially offset.

An electric machine rotor includes a plurality of plates. The plurality of plates stacked along a first axis. Each of the plates defines V-shaped pairs of cavities. Each V-shaped pair of cavities defines a pole arc angle. Each cavity has a permanent magnet pocket and a magnetic field guide chamber extending radially outward from the permanent magnet pocket relative to the first axis. Offset angles between the magnetic field guide chambers and the permanent magnet pockets varies between at least a first and a second of the V-shaped pairs of cavities within each plate such that each plate defines at least two different pole arc angles. The plates are stacked such that the permanent magnet pockets between adjacent plates are axially aligned and such that the magnetic field guide chambers between adjacent plates are axially offset.

DETAILED DESCRIPTION

Figure 1:
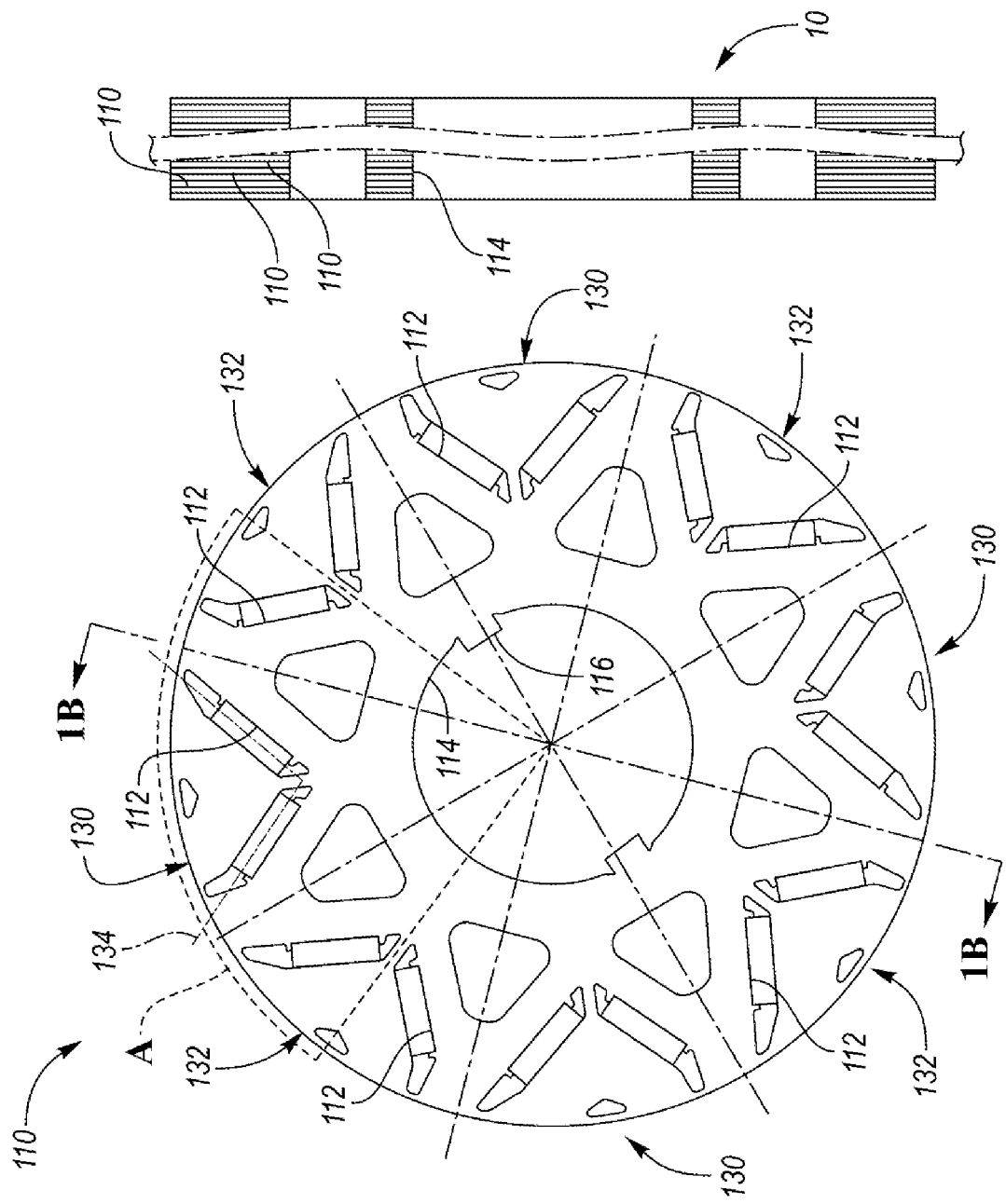
FIG. 1A is a plan view of a first embodiment of a rotor lamination.
FIG. 1B is a cross-sectional view taken along line 1B-1B of FIG. 1A of a rotor section comprised of a stack of laminations from FIG. 1A.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric machines may be characterized by an undesirable oscillation in torque, which is caused by harmonics present in the airgap flux and in the airgap permeance. This torque ripple is caused by harmonics that can be substantially mitigated through proper rotor design. Permanent magnets may be positioned or oriented about the rotor of the electric machine in different ways to generate desirable magnetic fields. Each of the poles may be formed by a single permanent magnet oriented with one pole (i.e., north or south) in the radially outward direction. The poles of the rotor may be formed by groups of permanent magnets arranged to cooperatively form magnetic poles. One such arrangement orients the magnets in a V-shaped pattern. The interior portion of the "V" has similar magnetic poles that cooperate to form a magnetic pole of the rotor. An 8-pole rotor includes eight V-shaped patterns disposed about the rotor and spaced by 45°. Each of the permanent magnets may be disposed in pockets or cavities to retain the permanent magnets. These pockets or cavities are typically rectangular and sized to receive the permanent magnets. The pockets may also include cavities that extend at opposite ends of the pockets and beyond the permanent magnets to limit magnetic flux leakage between north and south poles of the individual permanent magnets. The portions of the pockets or cavities that receive the permanent magnets may be referred to as permanent magnet pockets or cavities. The extended portions of the pockets may be referred to as magnetic field guide pockets, cavities, or chambers or may be referred to as magnetic field forming pockets, cavities, or chambers. Voids or cavities in the rotor core impede magnetic flux because a vacuum has a relatively low magnetic permeability compared to the rotor core material (e.g., electric steel).

The magnetic field guide chambers associated with each of the pockets may adjust the pole arc angle of the magnetic pole. Each of the magnetic poles of an eight pole rotor is designated in a 45° portion of the rotor lamination. This 45° portion is referred to as a mechanical pole pitch. Instead of allowing all of the magnetic poles to have an arc angle of 45°, the field forming chambers may be defined to guide the flux from each pole by reducing or widening the arc angle. The resulting arc angle from each of the poles may still accumulate to cover the entire 360° outer peripheral surface of the rotor or cover less than the entire outer peripheral surface of the rotor.

The rotor may be comprised of a plurality of laminations or laminated plates that are sequentially stacked in an axial direction along an axis of rotation of the rotor of the electric machine. The laminations are individually fabricated from a material such iron or steel. The laminations are then aligned in an axial direction (i.e., along the axis of rotation of the rotor) to form the rotor or the electric machine. The laminations may be stacked "loose", welded, or bonded together depending the desired application. The laminations may include a thin layer of insulating material (e.g., a thin layer of epoxy that is approximately 0.001 mm thick). There may or may not be small spaces between adjacent laminations at locations where the adjacent laminations are not affixed to each other, if the application requires the adjacent laminations to be affixed to each other (i.e., via welding or bonding).

Referring now to FIG. 1A, a first embodiment of a lamination 110 for a rotor is shown. The lamination 110 may define a plurality of cavities 112 adapted to hold permanent magnets in pockets. The center of the section 10 may define a circular central opening 114 with a keyway 116 for accommodating a driveshaft that may receive a drive key (not shown). The cavities may be oriented such that the permanent magnets (not shown) housed in the cavities 112 form eight alternating magnetic poles 130, 132. It is well known in the art that an electric machine may have various numbers of poles. The magnetic poles 130 may be configured to be north poles and the magnetic poles 132 may be configured to be south poles, or vice versa. The permanent magnets may also be arranged with different patterns. As shown in FIG. 1A, the cavities 112, which hold permanent magnets, are arranged in pairs that form V-shapes 134. Referring now to FIG. 1B, a plurality of laminations 110 may form a section 10 of the rotor. The rotor has a circular central opening 114 for accommodating a driveshaft (not shown).

Figure 2:
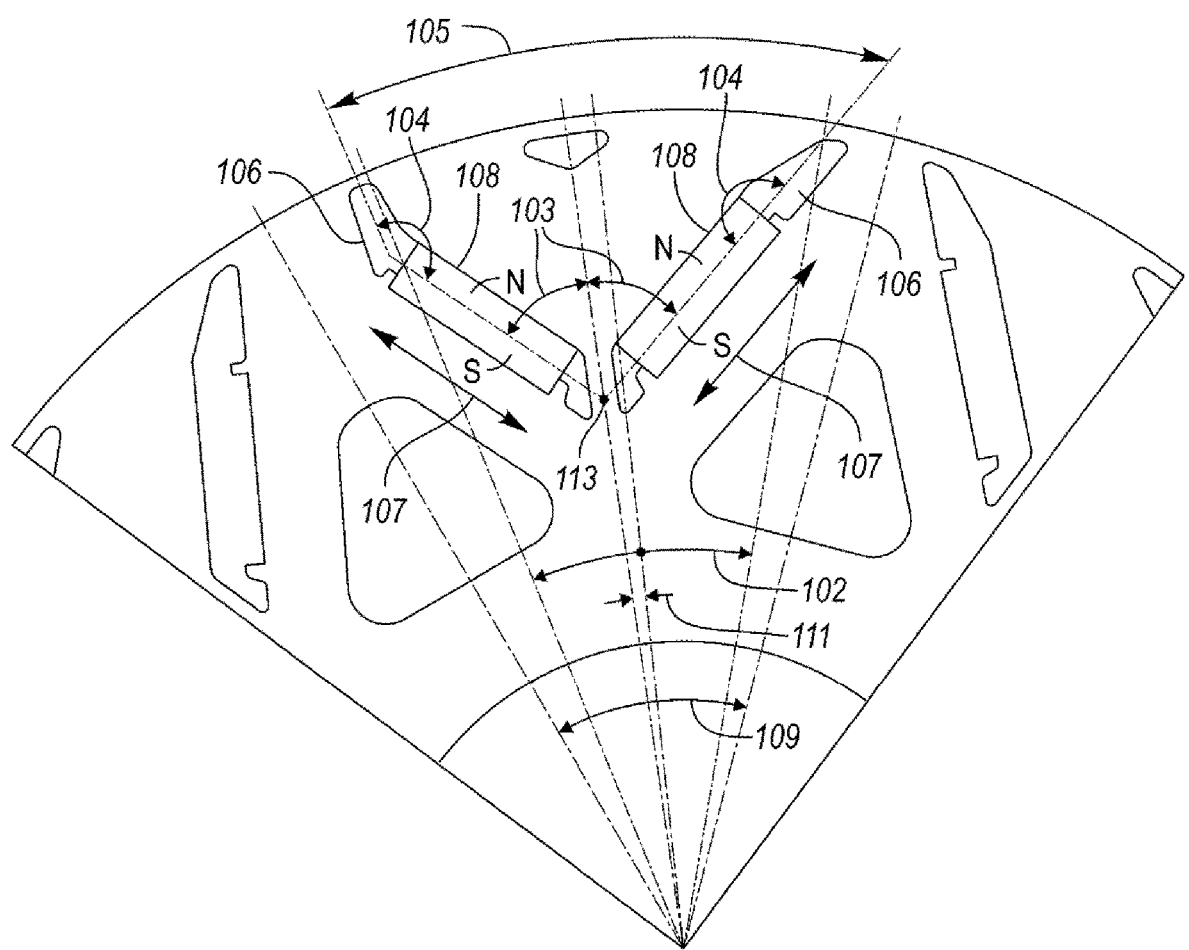
FIG. 2 is a plan view of a section of the rotor lamination comprising area A from FIG. 1A.

Referring now to FIG. 2, the section comprising area A from FIG. 1A is shown having a particular pole arc angle 102. The pole arc angle is shaped by the angle of the magnetic field guide chambers 106 relative to the magnet pockets 108. The section 10 may have a mechanical pole pitch 109 of 45°, as shown.

The pole arc angle 102 can be measured using a variety of methods. As shown, the pole arc angle 102 is measured as the angle between the most distinguished inner corner of the most radially outward portion of magnetic field guide chambers 106 from the central axis of the rotor. The pole arc angle 102 can also be measured from the outermost edges of the magnetic field guide chambers 106, the inner edges of the magnetic field guide chambers 106, or a hypothetical center of gravity (e.g., if the chamber was filled with a material, the center of gravity of that material). The pole arc angle 102 can also be measured as an angle 104 between the permanent magnet pockets 108 and magnetic field guide chambers 106. The angle 104 may be referred to as an orientation angle or an offset angle between the permanent magnet pockets 108 and magnetic field guide chambers 106. The two offset angles 104 between the magnet pockets 108 and magnetic field guide chambers 106 within each pair of V-shaped pair of cavities 112 differ such that there is an offset angle 111 between the center of the mechanical pole pitch 109 and the center of the pole arc angle 102.

The pole arc angle 102 may also be measured using the length of the arc 105 across the outer periphery of the rotor to define a surface. The surface may be defined by the length of the arc having a threshold magnitude of magnetic flux. For example, the shape of the features, chambers, may make it difficult to ascertain a generic definition and value for the pole arc angle. Under these circumstances, the magnetic flux crossing the arc length 105 or surface may be measured or estimated to determine the formed magnetic field. Measuring the result of the field-forming chamber may provide an improved indication of the desired pole arc angle instead of measuring the angle directly. This additional method may indirectly provide a comparison between the pole arc angles of the adjacent sections to determine whether magnetic skewing is used to reduce torque ripple.

The vertex for the angle may be determined as an intersection of an extension of the V-shaped permanent magnet pockets, an extension of the chambers, or a combination thereof. The vertex of the pole arc angle may also be the centroid of the section or lamination or the axis of rotation of the rotor.

In at least one other embodiment, the pole arc angles are defined by a magnet angle 103 and the orientation angle 104 relative to the magnet angle. The orientation angle 104 has a vertex defined at a point along an intersection of the pocket 108 and the chamber 106. One leg of the orientation angle is defined by a centerline passing through a centroid of the pocket 108. The centerline may be defined based on a center of mass or symmetry of the pocket. The other of the legs of the angle may be defined by a centerline passing through a centroid of the chamber 106. The centerline may be defined based on density or symmetry of the chamber. Any of the aforementioned methods or combinations thereof may be used to determine the pole arc angle.

The orientation or bending angles 104 may be determined by the relationship described in Equation (1):

$$\beta = 270° - \alpha - \tan^{-1} \frac{R_r \cos\left(\frac{\theta}{2}\right) - R_c - w_m \cos\alpha}{R_r \sin\left(\frac{\theta}{2}\right) - w_m \sin\alpha} \quad (1)$$

where $\beta$, which is the orientation angle 104, is equal to a function of the magnet angle $\alpha$ 103, the width of the permanent magnet pocket $w_m$ 107, the pole arc angle $\theta$ 102, the radial distance (i.e., the distance from the center of rotor) to the inner vertex 113 of the V-shaped magnet pocket, $R_c$, and the rotor outer radius, $R_r$.

The orientation angle 104, β, may be set between an angle relative to the magnet angle 103, α, as disclosed in Equation (2):

$$(180°-\alpha) \leq \beta \leq (270°-\alpha) \qquad (2)$$

Other features (e.g., holes, cavities) generally included on rotor laminations to control magnetic fields may be included or not included to properly form magnetic fields in the air gap.

The offset angle 111 may alternatively be defined as the offset between the center of the mechanical pole pitch 109 and the center of the pole arc as defined by any of the other variety methods (e.g., the offset angle 111 may be defined as the offset angle between the center of the mechanical pole pitch 109 and the center of angle 102 or angle 105). The pole arc angles are shown to be the same within each pair of V-shaped pair of cavities 112.

Figure 3:
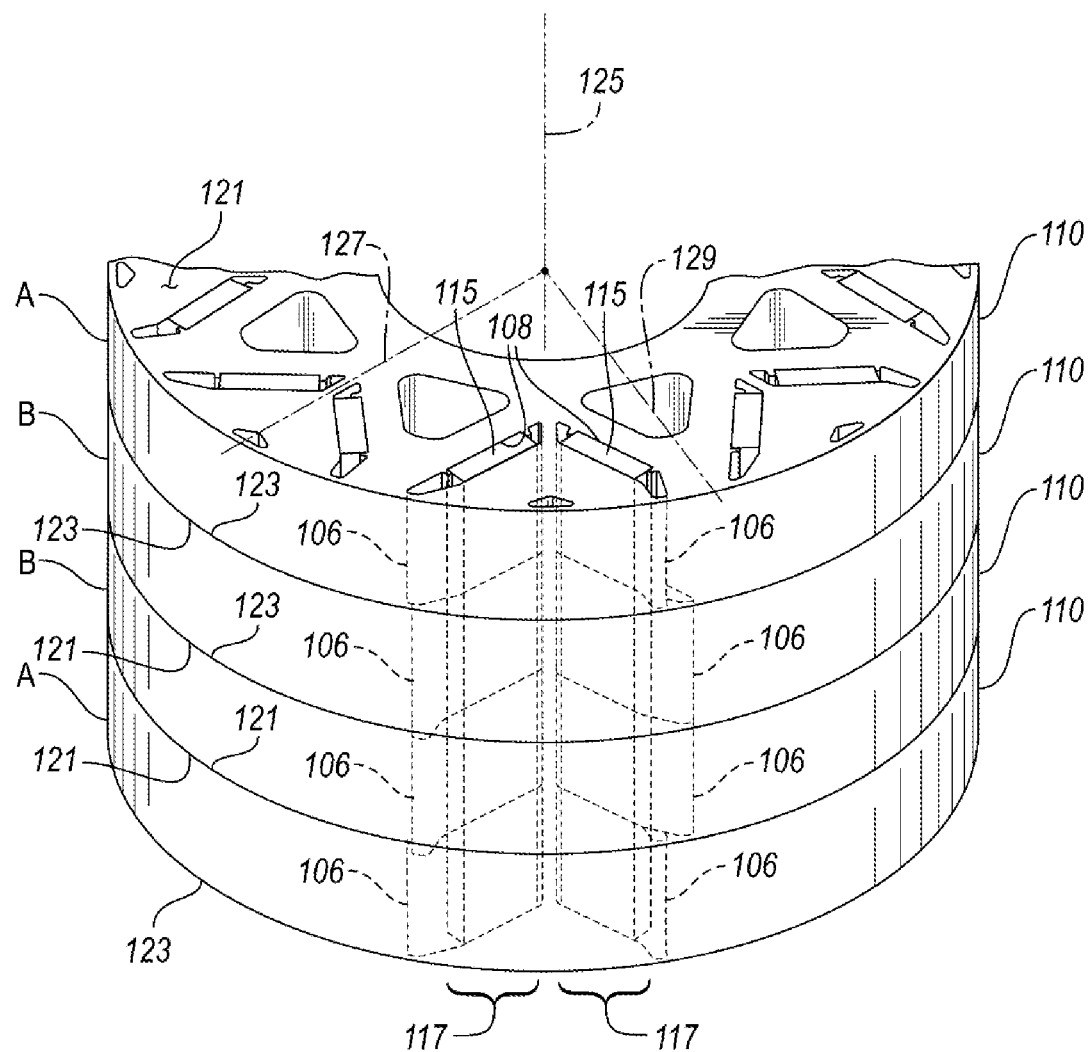
FIG. 3 is a perspective view of a rotor section comprised of a stack of laminations from FIG. 1A.

Referring now to FIG. 3, several laminations 110 are stacked to form a portion of a rotor. The sections have aligned permanent magnet pockets 108, which are retaining permanent magnets 115. Each of the permanent magnets 115 extends through a set of permanent magnet pockets 117. Each permanent magnet pocket 108 within each set 117 of permanent magnet pockets 108 may be axially aligned relative to each other (i.e., may be aligned in a direction that is substantially parallel to the axis of rotation of the rotor). Substantially parallel may refer to any incremental angle that is between exactly parallel and 15° from exactly parallel. Each set of permanent magnet pockets 117 includes one permanent magnet pocket 108 from each lamination 110. Although only four laminations 110 are illustrated in FIG. 3, it should be understood that each set 117 of permanent magnet pockets 108 may comprise a set of axially aligned magnet pockets that includes one magnetic pocket from each of the laminations 110 of the rotor if the rotor includes more than four laminations and that a single permanent magnet 115 may extend through all of the pockets 108 within a set of permanent magnet pockets 117 that includes all of the laminations of the rotor.

The field forming chambers 106 form offset pole arc angles relative to the mechanical pole pitch 109 to create magnetic skewing without skewing the magnets, which reduces axial flux leakage and increases torque production of the electric machine that includes the rotor. The laminations 110 are stacked such that the magnetic field guide chambers 106 between one or more the adjacent laminations 110 (or adjacent sections of two or more laminations 110) are axially offset (i.e., are offset or misaligned in a direction that is substantially parallel to the axis of rotation of the rotor) in order to further produce magnetic skewing without skewing the magnets.

Each of the laminations 110 has a front surface 121 and a rear surface 123. In order to reduce manufacturing costs, the V-shaped pairs of cavities 112 of each lamination may form an identical pattern that extends axially with respect to the axis of rotation of the rotor 125 from the front surface 121 to the rear surface 123. A first of the laminations 110 may be flipped or rotated about a second axis 127 that is perpendicular to the axis of rotation of the rotor 125 such that the rear surface 123 of the first of the laminations 110 contacts the rear surface 123 of a second of the laminations 110 within the stack. A third of the laminations 110 may be flipped or rotated about a third axis 129 that is perpendicular to the axis of rotation of the rotor 125 such that the front surface 121 of the third of the laminations 110 contacts the front surface 121 of a fourth of the laminations 110 within the stack. The second axis 127 and the third axis 129 may be radially offset (as shown) to each other relative to the axis of rotation of the rotor 125 or may be radially aligned to each other relative to the axis of rotation of the rotor 125. However, it should be noted that in order to maintain alignment of the keyways 116 of each lamination 110 within the stack, the second axis 127 and third 129 axis will need to be radially aligned to each other relative to the axis of rotation of the rotor 125 and will need to extend through the centers of the keyways 116. The second axis 127 and third axis 129 may be defined as the center line of a mechanical pole pitch (e.g., the second axis 127 as shown) or along an outer edge of any one of the mechanical pole pitches 109, which is also at the boundary between any of the adjacent mechanical pole pitches 109 (e.g., third axis 129), in order maintain axial alignment within each set of permanent magnet pockets 117.

The flipping or rotating of laminations 110 relative to each other about an axis that is perpendicular to the axis of rotation of the rotor 125 produces the axial offsetting of the magnetic field guide chambers 106 between adjacent laminations 110 when one of the adjacent laminations 110 has been flipped or rotated. Alternatively, if the pole arc angles are also different between one or more of the pair of V-shaped pair of cavities 112, the axial offsetting of the magnetic field guide chambers 106 may be accomplished by rotating adjacent laminations relative to each other about the axis of rotation of the rotor 125 by one or more mechanical pole pitches 109.

FIG. 3, depicts an ABBA rotor configuration, where the middle two laminations have been flipped relative to the outer two laminations. As shown, the permanent magnets are aligned such that minimal magnetic field leakage occurs between the sections. This configuration would also allow a single permanent magnet to traverse through each of sections, instead of multiple permanent magnets. An alternative BAAB rotor can be obtained by swapping the stacking sequence of section A and B (not shown). Other alternatives may also be ABAB or BABA. The rotor may include several stacks of one of the configurations (e.g., the rotor may include four stacks of the ABBA configuration) or may include several stacks of different configurations in any combination (e.g., the rotor may include four stacks, one with an ABBA configuration, one with a BAAB configuration, one with an ABAB configuration, and one with and BAAB configuration).

Although the embodiment described in FIGS. 1A-3 depicts laminations 110 where the offset angles 104 between the permanent magnet pockets 108 and magnetic field guide chambers 106 differ within each pair of V-shaped cavities, this disclosure should be construed to include laminations where the offset angles between the permanent magnet pockets and magnetic field guide chambers differ within one or more pairs of V-shaped cavities. Furthermore, although the embodiment described in FIGS. 1A-3 depicts the same pole arc angles within each pair of V-shaped pair of cavities 112, this disclosure should be construed to include laminations where the pole arc angles and the offset angles 104 may differ between two or more of the pairs of V-shaped cavities.

Figure 4:
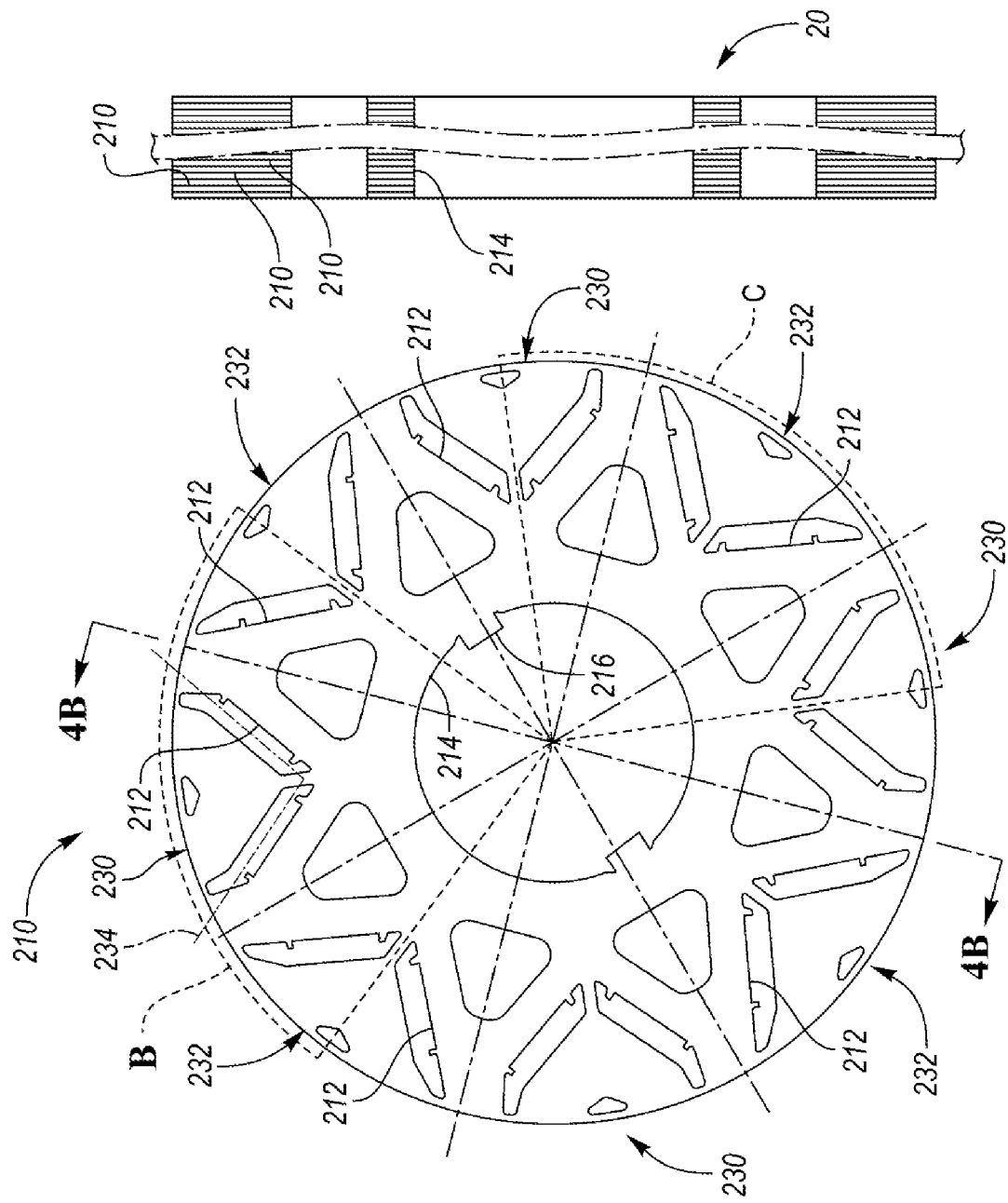
FIG. 4A is a plan view of a second embodiment of a rotor lamination.
FIG. 4B is a cross-sectional view taken along line 4B-4B of FIG. 4A of a rotor section comprised of a stack of laminations from FIG. 4A.

Referring now to FIG. 4A, a second embodiment of a lamination 210 for a rotor is shown. The lamination 210 may define a plurality of cavities 212 adapted to hold permanent magnets in pockets. The center of the section 20 may define a circular central opening 214 with a keyway 216 for accommodating a driveshaft that may receive a drive key (not shown). The cavities may be oriented such that the permanent magnets (not shown) housed in the cavities 212 form eight alternating magnetic poles 230, 232. It is well known in the art that an electric machine may have various numbers of poles. The magnetic poles 230 may be configured to be north poles and the magnetic poles 232 may be configured to be south poles, or vice versa. The permanent magnets may also be arranged with different patterns. As shown in FIG. 4A, the cavities 212, which hold permanent magnets, are arranged in pairs that form V-shapes 234. Referring now to FIG. 4B, a plurality of laminations 210 may form a section 20 of the rotor. The rotor has a circular central opening 214 for accommodating a driveshaft (not shown).

Figure 5:
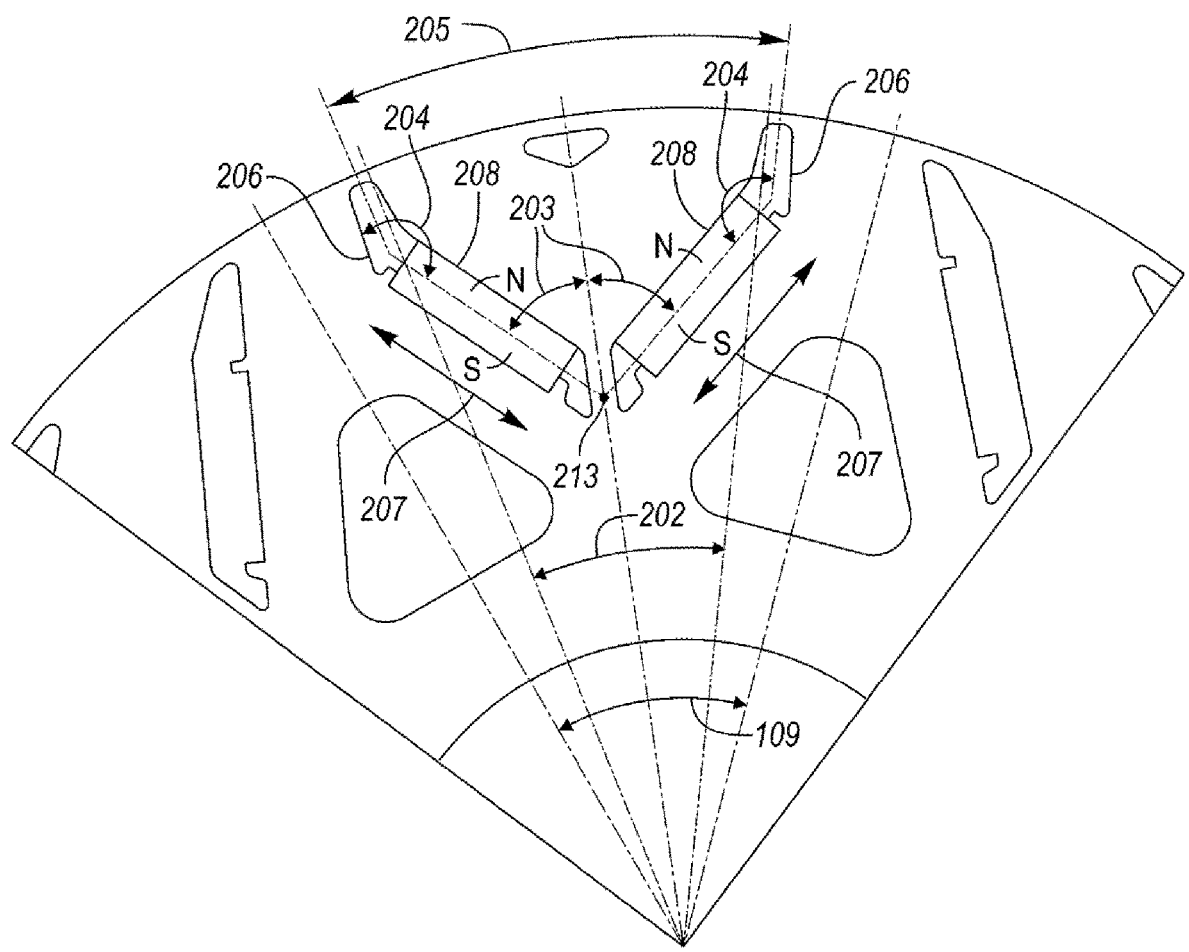
FIG. 5 is a plan view of a section of the rotor lamination comprising area B from FIG. 4A.

Referring now to FIG. 5, the section comprising area B from FIG. 4A is shown having a particular pole arc angle 202. The pole arc angle is shaped by the angle of the magnetic field guide chambers 206 relative to the magnet pockets 208. The section 20 may have a mechanical pole pitch 209 of 45°, as shown.

The pole arc angle 202 can be measured using a variety of methods. As shown, the pole arc angle 202 is measured as the angle between the most distinguished inner corner of the most radially outward portion of magnetic field guide chambers 206 from the central axis of the rotor. The pole arc angle 202 can also be measured from the outermost edges of the magnetic field guide chambers 206, the inner edges of the magnetic field guide chambers 206, or a hypothetical center of gravity (e.g., if the chamber was filled with a material, the center of gravity of that material). The pole arc angle 202 can also be measured as an angle 204 between the permanent magnet pockets 208 and magnetic field guide chambers 206. The angle 204 may be referred to as an orientation angle or an offset angle between the permanent magnet pockets 208 and magnetic field guide chambers 206. The two offset angles 204 between the magnet pockets 208 and magnetic field guide chambers 206 in the pair of V-shaped pair of cavities 212 are the same but may differ from the offset angles 204 in other pairs V-shaped pair of cavities on the lamination 210 (see offset angles 304 below).

The pole arc angle 202 may also be measured using the length of the arc 205 across the outer periphery of the rotor to define a surface. The surface may be defined by the length of the arc having a threshold magnitude of magnetic flux. For example, the shape of the features, chambers, may make it difficult to ascertain a generic definition and value for the pole arc angle. Under these circumstances, the magnetic flux crossing the arc length 205 or surface may be measured or estimated to determine the formed magnetic field. Measuring the result of the field-forming chamber may provide an improved indication of the desired pole arc angle instead of measuring the angle directly. This additional method may indirectly provide a comparison between the pole arc angles of the adjacent sections to determine whether magnetic skewing is used to reduce torque ripple.

The vertex for the angle may be determined as an intersection of an extension of the V-shaped permanent magnet pockets, an extension of the chambers, or a combination thereof. The vertex of the pole arc angle may also be the centroid of the section or lamination or the axis of rotation of the rotor.

In at least one other embodiment, the pole arc angles are defined by a magnet angle 203 and the orientation angle 204 relative to the magnet angle. The orientation angle 204 has a vertex defined at a point along an intersection of the pocket 208 and the chamber 206. One leg of the orientation angle is defined by a centerline passing through a centroid of the pocket 208. The centerline may be defined based on a center of mass or symmetry of the pocket. The other of the legs of the angle may be defined by a centerline passing through a centroid of the chamber 206. The centerline may be defined based on density or symmetry of the chamber. Any of the aforementioned methods or combinations thereof may be used to determine the pole arc angle.

The orientation or bending angles 204 may be determined by the relationship described in Equation (1) where β, which is the orientation angle 204, is equal to a function of the magnet angle α 203, the width of the permanent magnet pocket $w_m$ 207, the pole arc angle θ 202, the radial distance (i.e., the distance from the center of rotor) to the inner vertex 213 of the V-shaped magnet pocket, $R_c$, and the rotor outer radius, $R_r$.

The orientation angle 204, β, may be set between an angle relative to the magnet angle 203, α, as disclosed in Equation (2) above. Other features (e.g., holes, cavities) generally included on rotor laminations to control magnetic fields may be included or not included to properly form magnetic fields in the air gap.

Figure 6:
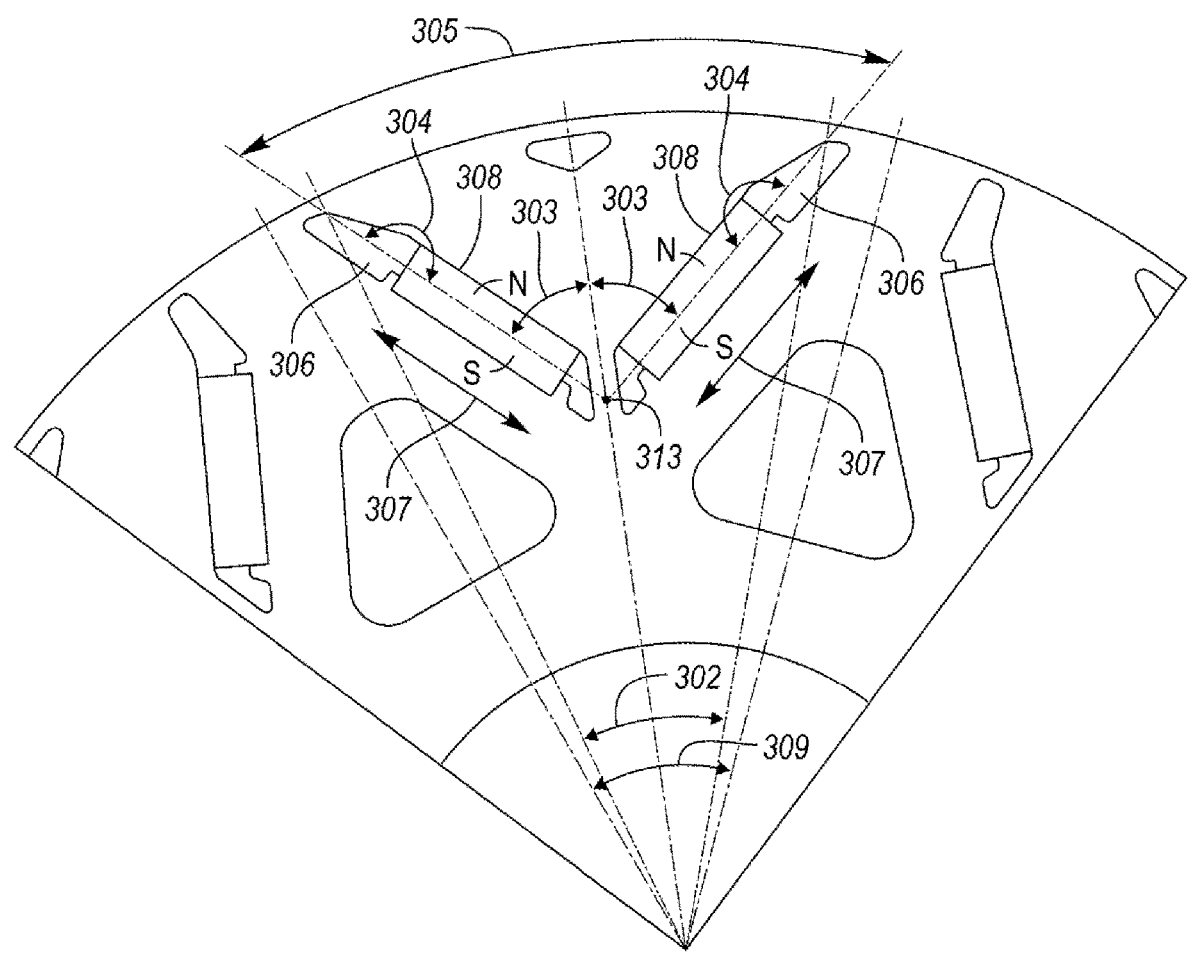
FIG. 6 is a reoriented plan view of a section of the rotor lamination comprising area C from FIG. 4A.

Referring now to FIG. 6, the section comprising area C from FIG. 4A is shown having a particular pole arc angle 302. The pole arc angle is shaped by the angle of the magnetic field guide chambers 306 relative to the magnet pockets 308. The section 20 may have a mechanical pole pitch 309 of 45°, as shown. The section comprising area C has been reoriented in FIG. 6 relative to FIG. 4A for illustrative purposes.

The pole arc angle 302 can be measured using a variety of methods. As shown, the pole arc angle 302 is measured as the angle between the most distinguished inner corner of the most radially outward portion of magnetic field guide chambers 306 from the central axis of the rotor. The pole arc angle 302 can also be measured from the outermost edges of the magnetic field guide chambers 306, the inner edges of the magnetic field guide chambers 306, or a hypothetical center of gravity (e.g., if the chamber was filled with a material, the center of gravity of that material). The pole arc angle 302 can also be measured as an angle 304 between the permanent magnet pockets 308 and magnetic field guide chambers 306. The angle 304 may be referred to as an orientation angle or an offset angle between the permanent magnet pockets 308 and magnetic field guide chambers 306. The two offset angles 304 between the magnet pockets 308 and magnetic field guide chambers 306 in the pair of V-shaped pair of cavities 312 are the same but may differ from the offset angles 304 in other pairs V-shaped pair of cavities on the lamination 210 (see offset angles 204 above).

The pole arc angle 302 may also be measured using the length of the arc 305 across the outer periphery of the rotor to define a surface. The surface may be defined by the length of the arc having a threshold magnitude of magnetic flux. For example, the shape of the features, chambers, may make it difficult to ascertain a generic definition and value for the pole arc angle. Under these circumstances, the magnetic flux crossing the arc length 305 or surface may be measured or estimated to determine the formed magnetic field. Measuring the result of the field-forming chamber may provide an improved indication of the desired pole arc angle instead of measuring the angle directly. This additional method may indirectly provide a comparison between the pole arc angles of the adjacent sections to determine whether magnetic skewing is used to reduce torque ripple.

The vertex for the angle may be determined as an intersection of an extension of the V-shaped permanent magnet pockets, an extension of the chambers, or a combination thereof. The vertex of the pole arc angle may also be the centroid of the section or lamination or the axis of rotation of the rotor.

In at least one other embodiment, the pole arc angles are defined by a magnet angle 303 and the orientation angle 304 relative to the magnet angle. The orientation angle 304 has a vertex defined at a point along an intersection of the pocket 308 and the chamber 306. One leg of the orientation angle is defined by a centerline passing through a centroid of the pocket 308. The centerline may be defined based on a center of mass or symmetry of the pocket. The other of the legs of the angle may be defined by a centerline passing through a centroid of the chamber 306. The centerline may be defined based on density or symmetry of the chamber. Any of the aforementioned methods or combinations thereof may be used to determine the pole arc angle.

The orientation or bending angles 304 may be determined by the relationship described in Equation (1) where β, which is the orientation angle 304, is equal to a function of the magnet angle α 303, the width of the permanent magnet pocket $w_m$ 307, the pole arc angle θ302, the radial distance (i.e., the distance from the center of rotor) to the inner vertex 313 of the V-shaped magnet pocket, $R_c$, and the rotor outer radius, $R_r$.

The orientation angle 304, β, may be set between an angle relative to the magnet angle 303, α, as disclosed in Equation (2) above. Other features (e.g., holes, cavities) generally included on rotor laminations to control magnetic fields may be included or not included to properly form magnetic fields in the air gap.

Figure 7:
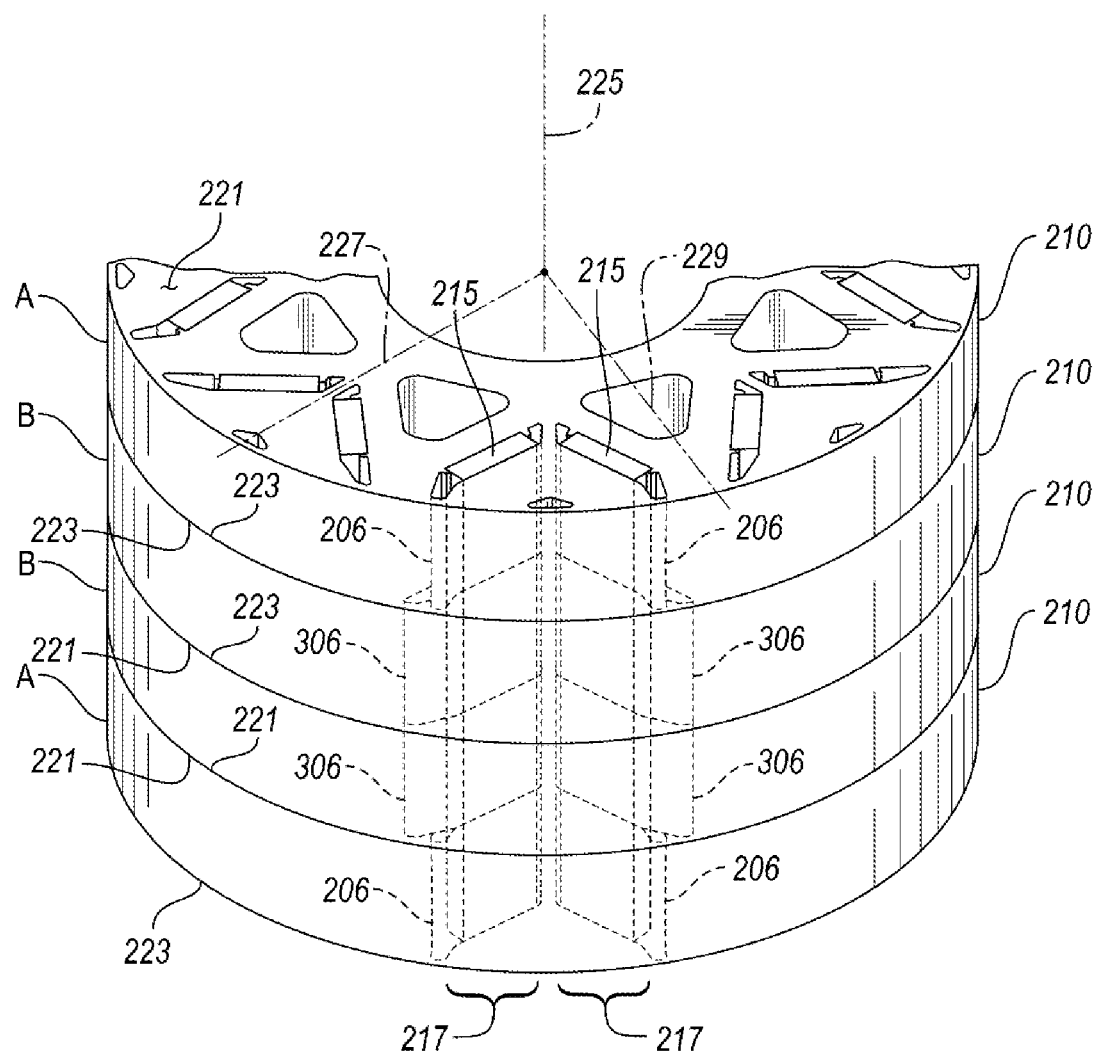
FIG. 7 is a perspective view of a rotor section comprised of a stack of laminations from FIG. 4A.

Referring now to FIG. 7, several laminations 210 are stacked to form a portion of a rotor. The sections have aligned permanent magnet pockets 208, 308 which are retaining permanent magnets 215. Each of the permanent magnets 215 extend through a set of permanent magnet pockets 217. Each permanent magnet pocket 208, 308 within each set 217 of permanent magnet pockets 208, 308 may be axially aligned relative to each other (i.e., may be aligned in a direction that is substantially parallel to the axis of rotation of the rotor). Substantially parallel may refer to any incremental angle that is between exactly parallel and 15° from exactly parallel. Each set of permanent magnet pockets 217 includes one permanent magnet pocket 208, 308 from each lamination 210. Although only four laminations 210 are illustrated in FIG. 7, it should be understood that each set 217 of permanent magnet pockets 208, 308 may comprise a set of axially aligned magnet pockets that includes one magnetic pocket from each of the laminations 210 of the rotor if the rotor includes more than four laminations and that a single permanent magnet 215 may extend through all of the pockets 208, 308 within a set of permanent magnet pockets 217 that includes all of the laminations of the rotor.

The field forming chambers 206, 306 form different pole arc angles to create magnetic skewing without skewing the magnets, which reduces axial flux leakage and increases torque production of the electric machine that includes the rotor. The laminations 210 are stacked such that the magnetic field guide chambers 206, 306 between one or more the adjacent laminations 210 (or adjacent sections of two or more laminations 210) are axially offset (i.e., are offset or misaligned in a direction that is substantially parallel to the axis of rotation of the rotor) in order further produce the magnetic skewing without skewing the magnets.

Each of the laminations 210 has a front surface 221 and a rear surface 223. In order to reduce manufacturing costs, the V-shaped pairs of cavities 212 of each lamination may form an identical pattern that extends axially with respect to the axis of rotation of the rotor 225 from the front surface 221 to the rear surface 223. A first of the laminations 210 may be flipped or rotated about a second axis 227 that is perpendicular to the axis of rotation of the rotor 225 such that the rear surface 223 of the first of the laminations 210 contacts the rear surface 223 of a second of the laminations 210 within the stack. A third of the laminations 210 may be flipped or rotated about a third axis 229 that is perpendicular to the axis of rotation of the rotor 225 such that the front surface 221 of the third of the laminations 210 contacts the front surface 221 of a fourth of the laminations 210 within the stack. The second axis 227 and the third axis 229 may be radially offset (as shown) to each other relative to the axis of rotation of the rotor 225 or may be radially aligned to each other relative to the axis of rotation of the rotor 225. However, it should be noted that in order to maintain alignment of the keyways 216 of each lamination 210 within the stack, the second axis 227 and third axis 229 will need to be radially aligned to each other relative to the axis of rotation of the rotor 225 and will need to extend through the centers of the keyways 216. The second axis 227 and third axis 229 may be defined as the center line of a mechanical pole pitch (e.g., the second axis 227 as shown) or along an outer edge of any one of the mechanical pole pitches 209, which is also at the boundary between any of the adjacent mechanical pole pitches 209 (e.g., third axis 229), in order maintain axial alignment within each set of permanent magnet pockets 217.

The flipping or rotating of laminations 210 relative to each other about an axis that is perpendicular to the axis of rotation of the rotor 225 produces the axial offsetting of the magnetic field guide chambers 206, 306 between adjacent laminations 210 when one of the adjacent laminations 210 has been flipped or rotated. Alternatively, the axial offsetting of the magnetic field guide chambers 206, 306 may be accomplished by rotating adjacent laminations relative to each other about the axis of rotation of the rotor 225 by one or more mechanical pole pitches 209.

FIG. 7, depicts an ABBA rotor configuration, where the middle two laminations have been flipped relative to the outer two laminations. As shown, the permanent magnets are aligned such that minimal magnetic field leakage occurs between the sections. This configuration would also allow a single permanent magnet to traverse through each of sections, instead of multiple permanent magnets. An alternative BAAB rotor can be obtained by swapping the stacking sequence of section A and B (not shown). Other alternatives may also be ABAB or BABA. The rotor may include several stacks of one of the configurations (e.g., the rotor may include four stacks of the ABBA configuration) or may include several stacks of different configurations in any combination (e.g., the rotor may include four stacks, one with an ABBA configuration, one with a BAAB configuration, one with an ABAB configuration, and one with and BAAB configuration).

The embodiment described in FIGS. 4A-7 depicts laminations 210 where the offset angles 204, 304 between the permanent magnet pockets 208, 308 and magnetic field guide chambers 206, 306 are the same within each pair of V-shaped cavities but differ between adjacent pairs of V-shaped cavities, resulting in a difference between the length of the pole arc angle 202 and the length of pole arc angle 302 (i.e., the length of the pole arc angle 202≠the length of pole arc angle 302). The embodiment described in FIGS. 4A-7 also depicts laminations 210 where the offset angles 204, 304 between the permanent magnet pockets 208, 308 and magnetic field guide chambers 206, 306 are identical in every of pair of V-shaped cavities. This disclosure, however, should be construed to include laminations where the offset angles between the permanent magnet pockets and magnetic field guide chambers are the same within each pair of V-shaped cavities but differ between two or more of the pairs of V-shaped cavities, or where the offset angles between the permanent magnet pockets and magnetic field guide chambers differ within at least one of the pairs of V-shaped cavities and differ between two or more of the pairs of V-shaped cavities.

Figure 8:
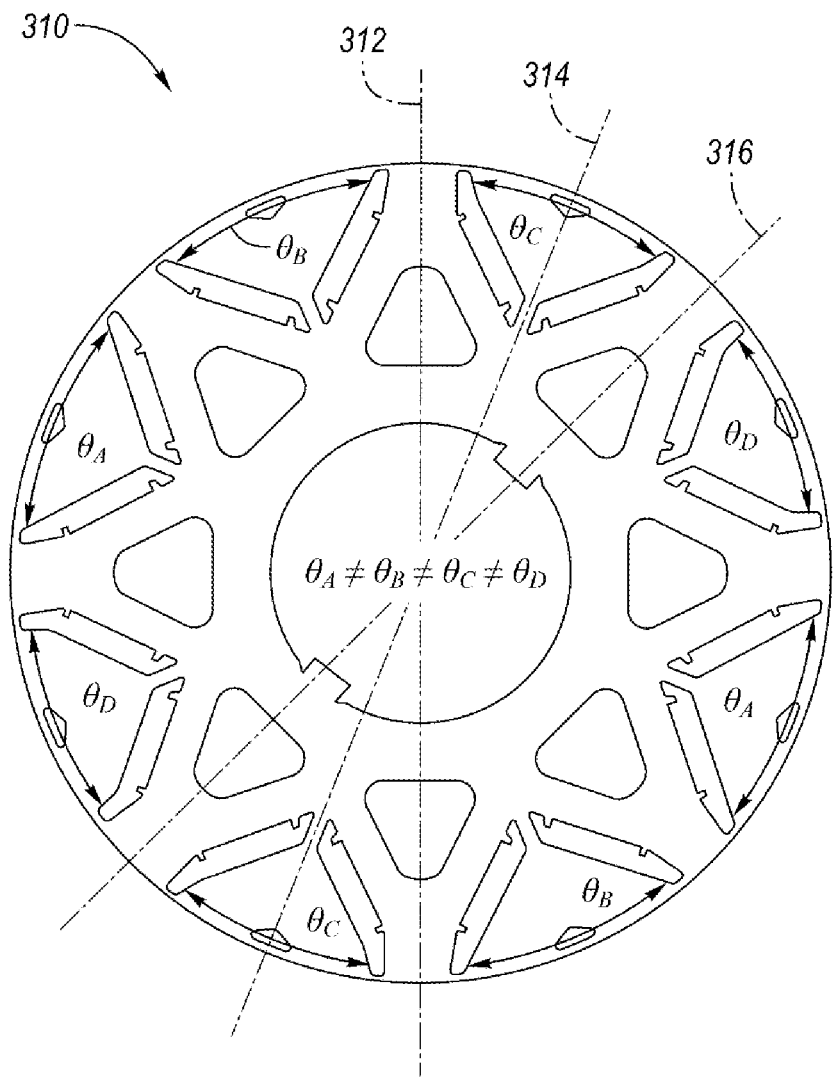
FIG. 8 is a first alternative of the second embodiment of the rotor lamination from FIG. 4A.

Referring now to FIG. 8, a first alternative embodiment of the lamination 310 where the offset angle between the permanent magnet pockets and magnetic field guide chambers differs between two or more pairs the V-shaped cavities is illustrated. Specifically, the embodiment in FIG. 8 depicts eight pairs of V-shaped cavities where the offset angle between the permanent magnet pockets and magnetic field guide chambers differs between every V-shaped pair of cavities in a series of four pairs of V-shaped cavities, but is the same in every fourth pair of V-shaped cavities resulting in different pole arc angles between every V-shaped pair of cavities in the series of four pairs of V-shaped cavities but the same pole arc angles repeating every fourth pair of V-shaped cavities. Such a configuration has a total of four different pole arc angles $\theta_a$, $\theta_b$, $\theta_c$, and $\theta_d$. Please note that $\theta_a \neq \theta_b \neq \theta_c \neq \theta_d$. In order to reduce manufacturing costs, the V-shaped pairs of cavities of each lamination 310 may form an identical pattern that extends axially with respect to the axis of rotation of a rotor formed by the laminations 310.

In a stack of laminations 310, each having the configuration illustrated in FIG. 8, every first lamination may not be rotated, every second lamination may be rotated about a first axis 312, every third lamination may be rotated about a second axis 314, and every fourth lamination may be rotated about a third axis 316 such that the orientations of within a stack of the laminations repeats in a pattern of four in order to produce the axial offsetting of the magnetic field guide chambers between adjacent laminations 310 (e.g., see FIGS. 3 and 7) in order produce the magnetic skewing without skewing the magnets.

Rotating the laminations 310 to the produce the axial offsetting of the magnetic field guide chambers between adjacent laminations 310, includes rotating the laminations approximately 180° about the respective axes. The first axis 312, second axis 314, and third axis 316 may all be perpendicular to an axis of rotation of a rotor formed by laminations 310 having the configuration illustrated in FIG. 8 but may all be offset radially to each other relative to the axis of rotation. The first axis 312, second axis 314, and third axis 316 may be defined as the center line of a mechanical pole pitch (e.g., the second axis 314) or along an outer edge of any one of the mechanical pole pitches, which is also at the boundary between any of the adjacent mechanical pole pitches (e.g., first axis 312), in order to produce the axial offsetting of the magnetic field guide chambers between adjacent laminations 310 while maintaining axial alignment within each set of permanent magnet pockets. Alternatively, the axial offsetting of the magnetic field guide chambers between adjacent laminations 310 may be accomplished by rotating adjacent laminations relative to each other about the axis of rotation of the rotor by one or more mechanical pole pitches. For example, every first lamination may not be rotated, every second lamination could be rotated one mechanical pole pitch, every third lamination could be rotated two mechanical pole pitches, and every fourth lamination could be rotated three mechanical pole pitches.

Figure 9:
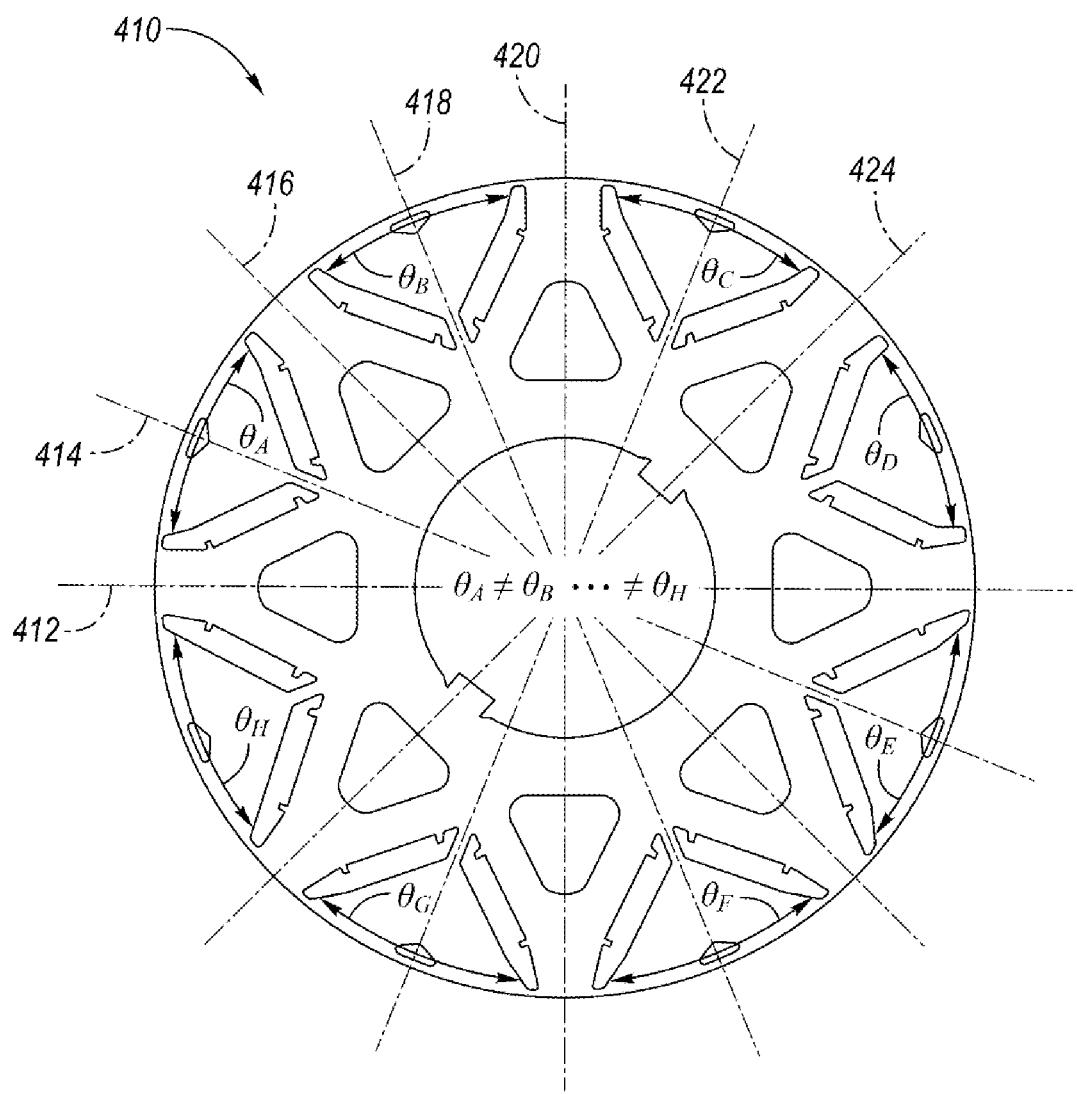
FIG. 9 is a second alternative of the second embodiment of the rotor lamination from FIG. 4A.

Referring now to FIG. 9, a second alternative embodiment of the lamination 410 where the offset angle between the permanent magnet pockets and magnetic field guide chambers differs between two or more pairs the V-shaped cavities is illustrated. Specifically, the embodiment in FIG. 9 depicts eight pairs of V-shaped cavities where the offset angle between the permanent magnet pockets and magnetic field guide chambers differs between every V-shaped pair of cavities resulting in different pole arc angles between every V-shaped pair of cavities. Such a configuration has a total of eight different pole arc angles $\theta_a$, $\theta_b$, $\theta_c$, $\theta_d$, $\theta_e$, $\theta_f$, $\theta_g$, and $\theta_h$. Please note that $\theta_a \neq \theta_b \neq \theta_c \neq \theta_d \neq \theta_e \neq \theta_f \neq \theta_g \neq \theta_h$. In order to reduce manufacturing costs, the V-shaped pairs of cavities of each lamination 410 may form an identical pattern that extends axially with respect to the axis of rotation of a rotor formed by the laminations 410.

In a stack of laminations 410, each having the configuration illustrated in FIG. 9, every first lamination may not be rotated, every second lamination may be rotated about a first axis 412, every third lamination may be rotated about a second axis 414, every fourth lamination may be rotated about a third axis 416, every fifth lamination may be rotated about a fourth axis 418, every sixth lamination may be rotated about a fifth axis 420, every seventh lamination may be rotated about a sixth axis 422, every eighth lamination may be rotated about a seventh axis 424 such that the orientations of within a stack of the laminations repeats in a pattern of eight in order to produce the axial offsetting of the magnetic field guide chambers between adjacent laminations 410 (e.g., see FIGS. 3 and 7) in order produce the magnetic skewing without skewing the magnets.

Rotating the laminations 410 to the produce the axial offsetting of the magnetic field guide chambers between adjacent laminations 410, includes rotating the laminations approximately 180° about the respective axes. The first axis 412, second axis 414, and third axis 416, fourth axis 418, fifth axis 420, sixth axis 422, and seventh axis 424 may all be perpendicular to an axis of rotation of a rotor formed by laminations 410 having the configuration illustrated in FIG. 9 but may all be offset radially to each other relative to the axis of rotation. The first axis 412, second axis 414, and third axis 416, fourth axis 418, fifth axis 420, sixth axis 422, and seventh axis 424 may be defined as the center line of a mechanical pole pitch (e.g., the second axis 414) or along an outer edge of any one of the mechanical pole pitches, which is also at the boundary between any of the adjacent mechanical pole pitches (e.g., first axis 412), in order to produce the axial offsetting of the magnetic field guide chambers between adjacent laminations 410 while maintaining axial alignment within each set of permanent magnet pockets. Alternatively, the axial offsetting of the magnetic field guide chambers between adjacent laminations 410 may be accomplished by rotating adjacent laminations relative to each other about the axis of rotation of the rotor by one or more mechanical pole pitches. For example, every first lamination may not be rotated, every second lamination could be rotated one mechanical pole pitch, every third lamination could be rotated two mechanical pole pitches, every fourth lamination could be rotated three mechanical pole pitches, every fifth lamination could be rotated four mechanical pole pitches, every sixth lamination could be rotated five mechanical pole pitches, every seventh lamination could be rotated six mechanical pole pitches, and every eighth lamination could be rotated seven mechanical pole pitches.

Figure 10:
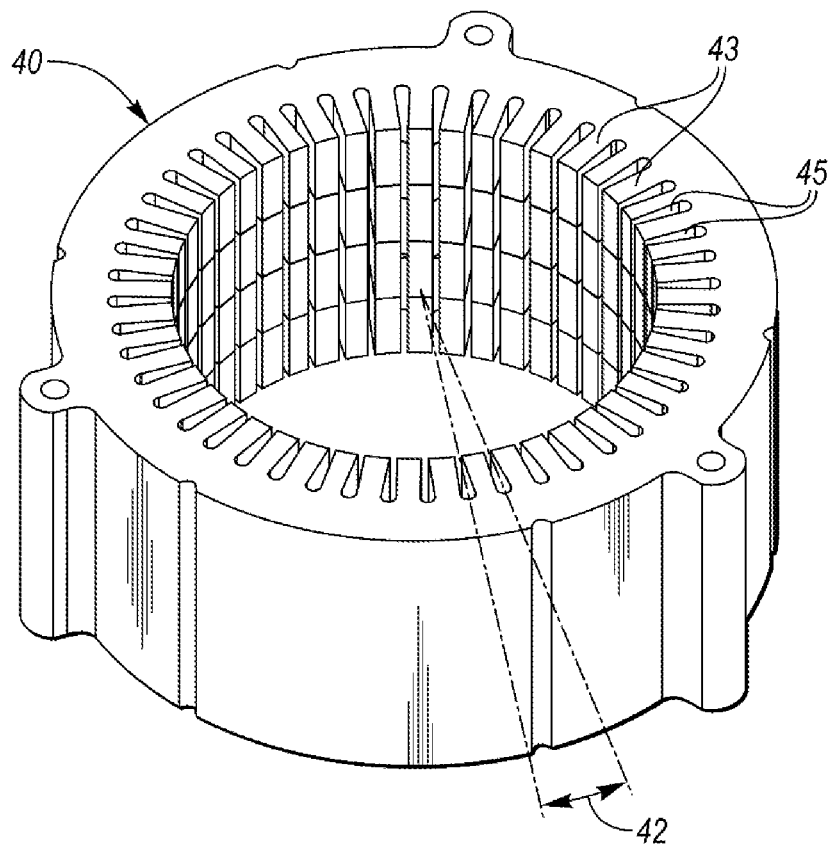
FIG. 10 is a perspective view of a stator.
Figure 11:
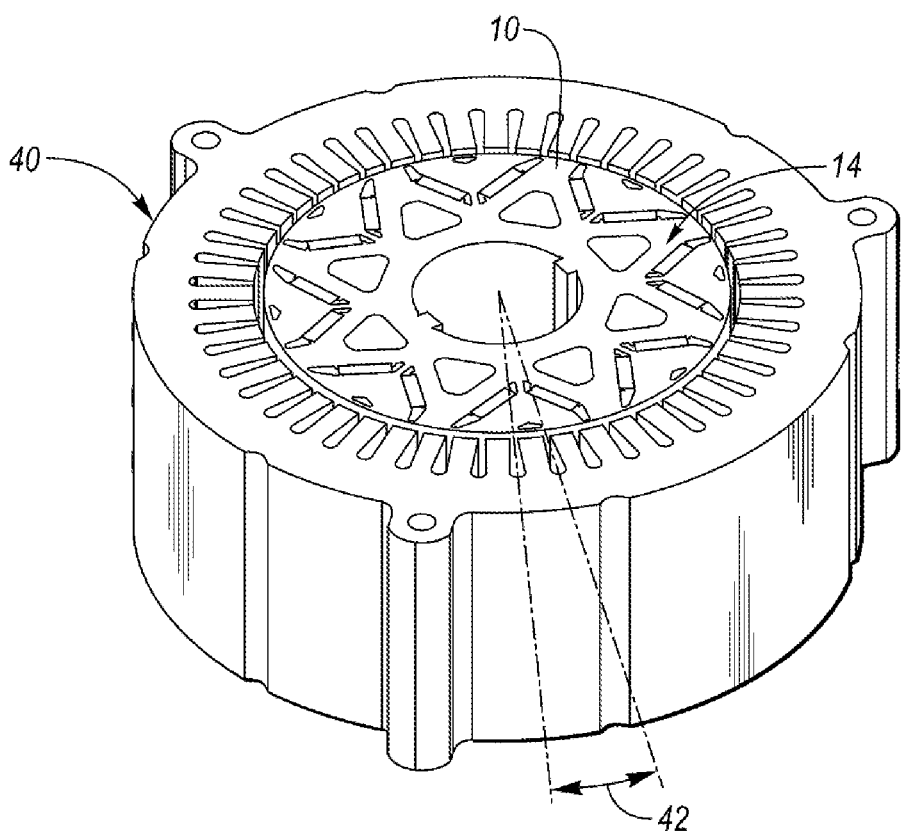
FIG. 11 is a perspective view of an electric machine having a stator and a rotor.

Now referring to FIGS. 10 and 11, a stator 40 is shown. The stator 40 has teeth 43 and stator winding cavities or slots 45 to support a set of stator windings. The stator 40 may surround a rotor 14 having a plurality of rotor sections from any of the embodiments described herein having permanent magnet pockets arranged therein. Some of the sections are not shown. The difference between the pole arc angle may be equal to the slot pitch 42 of the stator. The slot pitch 42 is the mechanical angle between adjacent slots arranged around the entire stator 40. For example, a 48-slot stator 40 has a slot pitch 42 of 7.5 degrees. The difference between the pole arc angles may be equal to the slot pitch 42 of the stator 40.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An electric machine rotor configured to rotate about a first axis comprising:
    a plurality of plates stacked along the first axis, each of the plates defining V-shaped pairs of cavities, each V-shaped pair of cavities defining a pole arc angle, each cavity having a permanent magnet pocket and a magnetic field guide chamber extending radially outward from the permanent magnet pocket relative to the first axis, wherein offset angles between the magnetic field guide chambers and the permanent magnet pockets varies within each plate, wherein the plates are stacked such that the permanent magnet pockets between adjacent plates are axially aligned and such that the magnetic field guide chambers between adjacent plates are axially offset, wherein each of the plates of the plurality of plates has a front surface and a rear surface, wherein the V-shaped pairs of cavities of each plate form an identical pattern that extends axially with respect to the first axis from the front surface to the rear surface, and wherein a first of the plurality of plates is rotated about a second axis that is perpendicular to the first axis such that the rear surface of the first plate contacts the rear surface of a second plate within the stack; and
    a plurality of permanent magnets, each permanent magnet extending through a set of permanent magnet pockets, wherein each permanent magnet pocket within each set of permanent magnet pockets are axially aligned relative to each other, and wherein each set of permanent magnet pockets includes one permanent magnet pocket from each plate.

2. The electric machine rotor of claim 1, wherein the offset angles between the magnetic field guide chambers and the permanent magnet pockets varies within at least one of the V-shaped pairs within each plate.

3. The electric machine rotor of claim 1, wherein the offset angles between the magnetic field guide chambers and the permanent magnet pockets varies between at least a first of the V-shaped pairs and a second of the V-shaped pairs within each plate.

4. The electric machine rotor of claim 1, wherein a third of the plurality of plates is rotated about a third axis that is perpendicular to the first axis such that the front surface of the third plate contacts the front surface of a fourth plate within the stack.

5. The electric machine rotor of claim 4, wherein the second axis and the third axis are radially offset to each other relative to the first axis.

6. The electric machine rotor of claim 4, wherein a first of the plurality of plates is rotated about the first axis such that the first plate contacts and is offset one or more mechanical pole pitches from an adjacent plate.

7. The electric machine rotor of claim 1, wherein at least a first and a second of the V-shaped pairs of cavities within each plate define at least two non-equal pole arc angles.

8. The electric machine rotor of claim 1, wherein at least a first, a second, a third, and a fourth of the V-shaped pairs of cavities within each plate define at least four non-equal pole arc angles.

9. An electric machine rotor comprising:
    a plurality of plates stacked along a first axis, each of the plates defining V-shaped pairs of cavities, each V-shaped pair of cavities defining a pole arc angle, each cavity having a permanent magnet pocket and a magnetic field guide chamber extending radially outward from the permanent magnet pocket relative to the first axis, wherein offset angles between the magnetic field guide chambers and the permanent magnet pockets vary within at least one of the V-shaped pairs of cavities and do not vary within at least one of the V-shaped pairs of cavities within each plate, wherein the plates are stacked such that the permanent magnet pockets between adjacent plates are axially aligned and such that the magnetic field guide chambers between adjacent plates are axially offset, wherein each of the plates of the plurality of plates has a front surface and a rear surface, wherein the V-shaped pairs of cavities of each plate form an identical pattern that extends axially with respect to the first axis from the front surface to the rear surface, and wherein a first of the plurality of plates is rotated about a second axis that is perpendicular to the first axis such that the rear surface of the first plate contacts the rear surface of a second plate within the stack.

10. The electric machine rotor of claim 9, wherein a third of the plurality of plates is rotated about a third axis that is perpendicular to the first axis such that the front surface of the third plate contacts the front surface of a fourth plate within the stack.

11. The electric machine rotor of claim 10, wherein the second axis and the third axis are radially offset to each other relative to the first axis.

12. The electric machine rotor of claim 9, wherein at least a first and a second of the V-shaped pairs of cavities within each plate define at least two non-equal pole arc angles.

13. The electric machine rotor of claim 9, wherein at least a first, a second, a third, and a fourth of the V-shaped pairs of cavities within each plate define at least four non-equal pole arc angles.

14. An electric machine rotor comprising:
    a plurality of plates stacked along a first axis, each of the plates defining V-shaped pairs of cavities, each V-shaped pair of cavities defining a pole arc angle, each cavity having a permanent magnet pocket and a magnetic field guide chamber extending radially outward from the permanent magnet pocket relative to the first axis, wherein offset angles between the magnetic field guide chambers and the permanent magnet pockets varies between at least a first and a second of the V-shaped pairs of cavities within each plate such that each plate defines at least two different pole arc angles, wherein the plates are stacked such that the permanent magnet pockets between adjacent plates are axially aligned and such that the magnetic field guide chambers between adjacent plates are axially offset, and wherein a first of the plurality of plates is rotated about the first axis such that the first plate contacts and is offset one or more mechanical pole pitches from an adjacent plate.

15. The electric machine rotor of claim 14, wherein each of the plates of the plurality of plates has a front surface and a rear surface, and wherein the V-shaped pairs of cavities of each plate form an identical pattern that extends axially with respect to the first axis from the front surface to the rear surface.

16. The electric machine rotor of claim 15, wherein a first of the plurality of plates is rotated about a second axis that is perpendicular to the first axis such that the rear surface of the first plate contacts the rear surface of a second plate within the stack.

17. The electric machine rotor of claim 16, wherein a third of the plurality of plates is rotated about a third axis that is perpendicular to the first axis such that the front surface of the third plate contacts the front surface of a fourth plate within the stack.

18. The electric machine rotor of claim 17, wherein the second axis and the third axis are radially offset to each other relative to the first axis.

19. The electric machine rotor of claim 14, wherein at least the first, the second, a third, and a fourth of the V-shaped pairs of cavities within each plate define at least four non-equal pole arc angles.

20. The electric machine rotor of claim 14, wherein at least the first, the second, a third, a fourth, a fifth, a sixth, a seventh, and an eighth of the V-shaped pairs of cavities within each plate define at least eight non-equal pole arc angles.

* * * * *